(12) United States Patent  (10) Patent No.: US 6,955,711 B2
Kawai et al.  (45) Date of Patent:  Oct. 18, 2005

(54) METHOD AND SYSTEM FOR SEPARATING GAS

(75) Inventors: Masato Kawai, Yokohama (JP); Akihiro Nakamura, Kofu (JP); Tatsuya Hidano, Ryuo-cho (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 0 days.

(21) Appl. No.: 10/474,325

(22) PCT Filed: Mar. 20, 2002

(86) PCT No.: PCT/JP02/02656

§ 371 (c)(1), (2), (4) Date: Oct. 8, 2003

(87) PCT Pub. No.: WO02/085496

PCT Pub. Date: Oct. 31, 2002

(65) Prior Publication Data

US 2004/0118278 A1 Jun. 24, 2004

(30) Foreign Application Priority Data

Apr. 16, 2001 (JP) ........................ 2001-116836

(51) Int. Cl.$^7$ ............................ B01D 53/053
(52) U.S. Cl. ............... 95/96; 95/127; 95/130; 95/138; 96/130; 96/132; 96/143; 96/153
(58) Field of Search ............... 95/96–98, 100, 95/103–105, 127, 130, 138; 96/121, 130, 133, 143, 144, 153

(56) References Cited

U.S. PATENT DOCUMENTS

| | | | | |
|---|---|---|---|---|
| 4,190,424 A | * | 2/1980 | Armond et al. ................ | 95/98 |
| 4,264,340 A | | 4/1981 | Sircar et al. | |
| 4,369,048 A | | 1/1983 | Pence | |
| 4,386,945 A | * | 6/1983 | Gardner ........................ | 95/98 |
| 4,448,592 A | * | 5/1984 | Linde .......................... | 95/130 |
| 4,529,412 A | * | 7/1985 | Hayashi et al. ................ | 95/96 |
| 4,566,881 A | * | 1/1986 | Richter et al. ................ | 95/98 |
| 4,661,125 A | | 4/1987 | Haruna et al. | |
| 4,744,803 A | * | 5/1988 | Knaebel ........................ | 95/98 |
| 4,810,265 A | | 3/1989 | Lagree et al. | |
| 4,914,218 A | * | 4/1990 | Kumar et al. ................ | 95/100 |
| 4,948,391 A | | 8/1990 | Noguchi | |
| 4,959,083 A | * | 9/1990 | Garrett ........................ | 95/98 |
| 5,330,561 A | | 7/1994 | Kumar et al. | |
| 5,632,807 A | * | 5/1997 | Tomita et al. ................ | 96/131 |
| 5,658,371 A | * | 8/1997 | Smolarek et al. ............. | 95/101 |
| 2002/0134240 A1 | * | 9/2002 | Zhong et al. ................ | 95/96 |
| 2003/0000385 A1 | * | 1/2003 | Kawai et al. ................ | 95/96 |

FOREIGN PATENT DOCUMENTS

| | | |
|---|---|---|
| EP | 0 163 242 | 12/1985 |
| EP | 0302658 A2 * | 2/1989 |
| EP | 0 342 877 | 11/1989 |
| EP | 0509638 A1 * | 10/1992 |
| EP | 0 598 319 | 5/1994 |
| EP | 0 813 211 A1 | 12/1997 |
| GB | 2 011 272 A | 7/1979 |
| GB | 1 551 824 | 9/1979 |
| JP | SHO 52-52181 | 4/1977 |
| JP | SHO 54-132476 | 10/1979 |
| JP | HEI 07-267612 | 11/1980 |
| JP | SHO 55-147119 | 11/1980 |
| JP | 60-246206 | 12/1985 |
| JP | HEI 01-184016 | 7/1989 |
| JP | 1-184016 | 7/1989 |
| JP | HEI 01-297119 | 11/1989 |
| JP | 2-51405 | 2/1990 |
| JP | 2-115016 | 4/1990 |
| JP | 6-254335 | 9/1994 |
| JP | 2000-241590 | 9/2000 |

\* cited by examiner

*Primary Examiner*—Robert H. Spitzer
(74) *Attorney, Agent, or Firm*—Nixon & Vanderhye P.C.

(57) ABSTRACT

Component contained in a gas mixture can be separated based on a PSA method and recovered with high purities at the same time, the system is simple, the system cost is low, and the operation is easy and may be used for separating oxygen and nitrogen from air or for separating noble gaseand nitrogen from a gas mixture containing noble gases and nitrogen, and obtaining each gas as a product.

8 Claims, 3 Drawing Sheets s

METHOD AND SYSTEM FOR SEPARATING GAS

The application is the U.S. national phase of international application PCT/JP02/02656, filed Mar. 20, 2002, which designated the U.S.

TECHNICAL FIELD

The present invention relates to a method and a system for separating and recovering useful gas from a gas mixture containing a plurality of components. In particular, the present invention relates to a gas separation method and a system which are suitably used for separating oxygen and nitrogen from air or for separating noble gases and nitrogen from a gas mixture containing noble gases and nitrogen, and obtaining each gas as a product.

BACKGROUND ART

Cryogenic air separation methods have been widely used as methods for separating and recovering oxygen and nitrogen, which are contained in air, from air as a feed gas. In these cryogenic air separation methods, feed air is liquefied and oxygen and nitrogen are distilled by utilizing the difference in boiling points of nitrogen and oxygen. Since this cryogenic air separation method has high system costs, it is suitably utilized in a system consuming a large amount of products.

A pressure swing adsorption method (abbreviated as "PSA method" below) utilizing an adsorbent for separation has been recently used for separation and recovery of air components. When oxygen is separated and recovered as a product from air by this PSA method, zeolite is used as an adsorbent. When pressurized air is introduced into an adsorption column filled with zeolite, nitrogen, which is easily adsorbed by zeolite, is adsorbed and held by zeolite, and oxygen, which is not readily adsorbed by zeolite, passes through the adsorption column and flows out (an adsorption step). Then, when the pressure in the adsorption column filled with the zeolite adsorbent decreases until it is less than the pressure in the adsorption column during the adsorption step, nitrogen, which is adsorbed and held by the zeolite adsorbent during the adsorption step, is desorbed and flows out from the adsorption column and recovered (a regeneration step).

In the PSA method, the adsorption step, which is performed under relatively high pressures, and the regeneration step, which is performed under relatively low pressures, are alternately repeated in a short time. Therefore, it is easy to increase the recovery amount of a desired product per unit mass of the adsorbent, and the system for the PSA method can be reduced in size.

For example, in a PSA method, when the adsorption step and the regeneration step are alternately performed using two adsorption columns, the desired product can be successively recovered from the two adsorption columns. In almost all PSA methods, a component, which is not readily adsorbed by the adsorbent and passes through and flows out of the adsorption column, is recovered with high purity. When a component, which is easily adsorbed by the adsorbent, is recovered as a desired product, the adsorbent adsorbs the component, which is easily adsorbed, but the adsorbent also simultaneously adsorbs a small amount of other components, which are not readily adsorbed. In addition, the other components, which are not readily adsorbed, remain in void spaces between the adsorbents. During the regeneration step, in which the pressure in the adsorption column is decreased, the other components in the adsorption column, which are not readily adsorbed, are caused to flow out together with the desorbed gas. Therefore, the component of products, which are easily adsorbed, contain a considerable amount of the other components, which are not readily adsorbed. Moreover, a mixing ratio between the components, one of which is easily adsorbed and the other of which is not readily adsorbed and which flow out from the adsorption column during the regeneration step, is determined depending on the property of use adsorbents.

Therefore, When the component which is easily adsorbed is recovered as a product with high purity, during the regeneration step before the adsorption step, it is necessary to purge the adsorption column which is condition in the end of the adsorption step using the component which is easily adsorbed and is recovered as a product (which is recovered by desorbing in the previous step). This leads to complications in the separation and recovery steps. In addition, this also requires the provision of further equipment for purging, such as compressors.

In order to recover a desired gas product having high purity, a conventional device and method for separating gas based on the PSA method, mainly targets only one component contained in a gas mixture containing a plurality of component gases.

For example, Unexamined Japanese Patent Application, First Publication No. Sho 55-147119 discloses a PSA method for separating and recovering each of the plurality of components with high purities from a gas mixture. This separation method utilizes an adsorption system comprising a preliminary column filled with an adsorbent which selectively adsorbs $H_2O$ and $CO_2$ contained in air, and a main column filled with another adsorbent which selectively adsorbs nitrogen rather than oxygen. This separation method provides oxygen enriched air and nitrogen with high purity.

A conventional method for separating air based on a PSA method disclosed in Unexamined Japanese Patent Application, First Publication No. Sho 55-147119 is explained below with reference to FIG. 3.

The PSA air separation system 50 comprises preliminary columns Y1 and Y2 filled with an adsorbent, which selectively adsorbs $H_2O$ and $CO_2$, and main columns Z1 and Z2 filled with another adsorbent, such as zeolite, which selectively adsorbs nitrogen. These columns form two pairs of treatment systems comprising the preliminary column Y1 and the main column Z1, and the preliminary column Y2 and the main column Z2. These treatment systems are connected so as to be provided with feed air alternately. While one treatment system is provided with feed air and oxygen enriched air is yielded by adsorbing the nitrogen (an adsorption step), the other treatment system desorbs the nitrogen which is adsorbed by the adsorbent in the previous adsorption step, and provides nitrogen having high purity (a regeneration step).

For example, when the combination comprising the preliminary column Y1 and the main column Z1 is in the adsorption step and the other combination comprising the preliminary column Y2 and the main column Z2 is in the regeneration step, the system comprising these combinations is operated as follows.

When the treatment system comprising the preliminary column Y1 and the main column Z1 is in the adsorption step, a feed air MA is introduced into the pipeline 51, passed through the valve V51 and the blower 52, thereby the feed air is pressurized to a predetermined pressure, and the pressurized feed air is passed through the pipeline 53, the valve V52 and pipeline 54, and is supplied into the preliminary column Y1. In the preliminary column Y1, $H_2O$ and $CO_2$ are adsorbed and removed from the feed air. Then, the air M, from which $H_2O$ and $CO_2$ are adsorbed and removed, is passed through the valve V53 and is then introduced into the main column Z1 filled with the zeolite adsorbent. While passing through the main column Z1, the nitrogen component contained in the air M is adsorbed by the zeolite adsorbent. The oxygen, which is not easily adsorbed by the zeolite adsorbent, is concentrated and becomes an oxygen enriched air. The oxygen enriched air is caused to flow into the pipeline 55, pass through the valve V54 and the pipeline 56, and is recovered in the oxygen enriched air tank 57. After that, the oxygen enriched air is supplied into a point of use, via the pipeline 58.

When the treatment system comprising the preliminary column Y2 and the main column Z2 is in the regeneration step, the valve V65 is opened, and thereby nitrogen gas containing the oxygen accumulated in the main column Z2 is caused to flow out into the pipeline 65. Then, the nitrogen gas containing the oxygen is passed through the valve V65 and the pipelines 69 and 60, and is recovered in the exhaust gas tank 61. The exhaust gas is used for regeneration cleaning of the preliminary columns Y1 and Y2. After that, the nitrogen adsorbed by the adsorbent in the main column Z2 is desorbed by closing the valve V65 and opening the valves V63 and V66 and operating the vacuum pump 62. The desorbed nitrogen is passed through the valve V63 and the preliminary column Y2, the pipeline 64, the valve V66, and the pipelines 63 and 67 via the vacuum pump 62, and is then recovered in the nitrogen storage tank 68 as a nitrogen gas product having high purity. After that, the nitrogen gas product is supplied into a point of use, via the pipeline 70.

As explained above, the treatment systems comprising the preliminary column Y1 and the main column Z1, and the preliminary column Y2 and the main column Z2 are alternately in the adsorption step and the regeneration step by operating the valves. In this method, in order to yield the nitrogen gas product having high purity, after the adsorption step and before the regeneration step, a cleaning step is performed. In the cleaning step, the recovered nitrogen is caused to flow out of the nitrogen storage tank 68 and is introduced into the pipeline 71, the valve V67, the pipeline 72, the circulation blower 73, the pipeline 74, and the valves V75 and V76, and is supplied into the main column Z1 or Z2. The introduced nitrogen gas cleans the main column Z1 or Z2, that is, the nitrogen concentration in the main column Z1 or Z2 is increased by introduction of nitrogen gas. Thereby, the purity of the nitrogen gas product is increased.

However, during the regeneration step, nitrogen for desorbing is introduced into the main column Z1 and Z2 in a flow direction which is opposite from the flow direction of the feed air during the adsorption step. In other words, nitrogen which is desorbed from the main column Z1 and Z2 has high purity, but in the regeneration step, since this nitrogen passes through the preliminary column Y1 or Y2 absorbing $H_2O$ and $CO_2$ and this nitrogen flows out together with $H_2O$ and $CO_2$. Therefore, the nitrogen contains a high percentage of $H_2O$ and $CO_2$ as impurities. Therefore, it is necessary for these impurities to be removed, this leads to the need for the provision of further equipment, for example, additional blowers, air flow devices, and refining devices, such as dryers. Due to this, the separation system is complicated and the system cost also increases.

As explained above, in the air separation method disclosed in Unexamined Japanese Patent Application, First Publication No. Sho 55-147119, the exhaust gas containing oxygen at a relatively high concentration, which is exhausted by cleaning the main columns using the nitrogen product, is recovered by passing the pipelines used for introducing the feed air. In contrast, in the air separation method disclosed in Unexamined Japanese Patent Application, First Publication No. Hei 1-297119, the exhaust gas containing oxygen with a relative high concentration is recovered as a part of the oxygen enriched air product. These methods also have the problem that the nitrogen product is contaminated with $H_2O$ and $CO_2$ and the system is complicated.

Unexamined Japanese Patent Application, First Publication No. Sho 52-52181 discloses a recovery method for oxygen gas having a high purity of 99% or greater in which an adsorption column filled with a molecular sieve carbon (abbreviated as "MSC" below) and an adsorption column filled with a zeolite are connected, and feed gas is caused to flow through these columns successively in contacting. In general, when oxygen is recovered from air by zeolite, zeolite does not adsorb with argon very much and therefore, the oxygen product is contaminated with argon. Therefore, the oxygen concentration after adsorption and separation is less than about 95%. In this method, in order to yield an oxygen product having a concentration of 95% or more, two kinds of the adsorbents are used, depending on the composition of the feed gas.

In this adsorption and separation method disclosed in Unexamined Japanese Patent Application, First Publication No. Sho 52-52181, the gas mixture, which is caused to flow out from the first adsorption column filled with the first adsorbent and which contains the main gas component with a high percentage content is used as a feed gas for the second adsorption column filled with the second adsorbent, or is recovered as a gas product. Therefore, a pump unit for sending the desorbed gas from one adsorption column to the other adsorption column or for circulating the desorbed gas through the adsorption column is required. The system is complicated, and the system cost is increased.

As explained above, almost all of the conventional gas separation methods and systems which are based on PSA methods separate and recover only one component in the raw gas mixture with high purity. A separation method and system which can yield a plurality of components with high purity as products has been desired.

In consideration of the above-described problems, it is an object of the present invention to provide a gas separation method and a system based on a PSA method, in which a plurality of components contained in a gas mixture can be separated and recovered at high purities at the same time, the system being simple, the system cost being low, and the operation being easy.

DISCLOSURE OF INVENTION

In order to achieve the objects, the present invention provides a method for separating gas in which at least two main gas components are separated and recovered from a gas mixture containing the at least two main gas components by a pressure swing adsorption method, wherein the method comprises the steps of: pressurizing the gas mixture, alternately repeating a step in which a first main gas component is separated as a first gas product using a first adsorbent, which does not readily adsorb the first main gas component and which easily adsorbs a second main gas component, and a step, in which the second main gas component is separated as a second gas product using a second adsorbent, which easily adsorbs the first main gas component and which does not readily adsorb the second main gas component, and thereby the first and second gas products are yielded simultaneously from the gas mixture.

A method for separating gas according to the present invention is provided wherein during the step in which the first and second main gas components are separated as the first and second gas products, the first and second gas products are stored in product tanks; and after the step in which the first and second main gas components are separated as the first and second gas products, the first and second gas products, which are stored in the product tanks, are used for purging the first and second adsorbents.

A method for separating gas according to the present invention is provided wherein the gas mixture is air.

A method for separating gas according to the present invention is provided wherein the gas mixture contains nitrogen and at least one of krypton and xenon.

A method for separating gas according to the present invention is provided wherein the first adsorbent is a zeolite and the second adsorbent is a molecular sieve carbon.

A method for separating gas according to the present invention is provided wherein one of the main gas components is nitrogen containing at least one of krypton and xenon; the first adsorbent is a Na-A type zeolite which selectively adsorbs nitrogen; and the second adsorbent is an activated carbon which selectively adsorbs krypton and xenon.

A system for separating gas is provided in which at least two main gas components are separated from a gas mixture containing the at least two main gas components by a pressure swing adsorption system, wherein the system comprises a gas pressurizing device; a first adsorption column filled with a first adsorbent, which does not readily adsorb the first main gas component and which easily adsorbs a second main gas component; a second adsorption column filled with a second adsorbent, which easily adsorbs the first main gas component and which does not readily adsorb the second main gas component; and pipelines and valves for introducing alternately the gas mixture into the first and second columns and out through which the first and second main gas components from the first and second columns flow.

A system for separating gas according to the present invention is provided wherein the system further comprises a first product tank for storing the first main gas component, which is provided with a pipeline connected with the first adsorption column; a pipeline through which first main gas component from the first product tank flows back to the first adsorption column; a second product tank for storing the second main gas component, which is provided with a pipeline connected with the second adsorption column; and a pipeline through which the second main gas component from the second product tank blows back to the second adsorption column.

MODES FOR CARRYING OUT THE INVENTION

The method and the system for separating gas of the present invention will be explained with reference to figures.

First Embodiment

Figure 1:
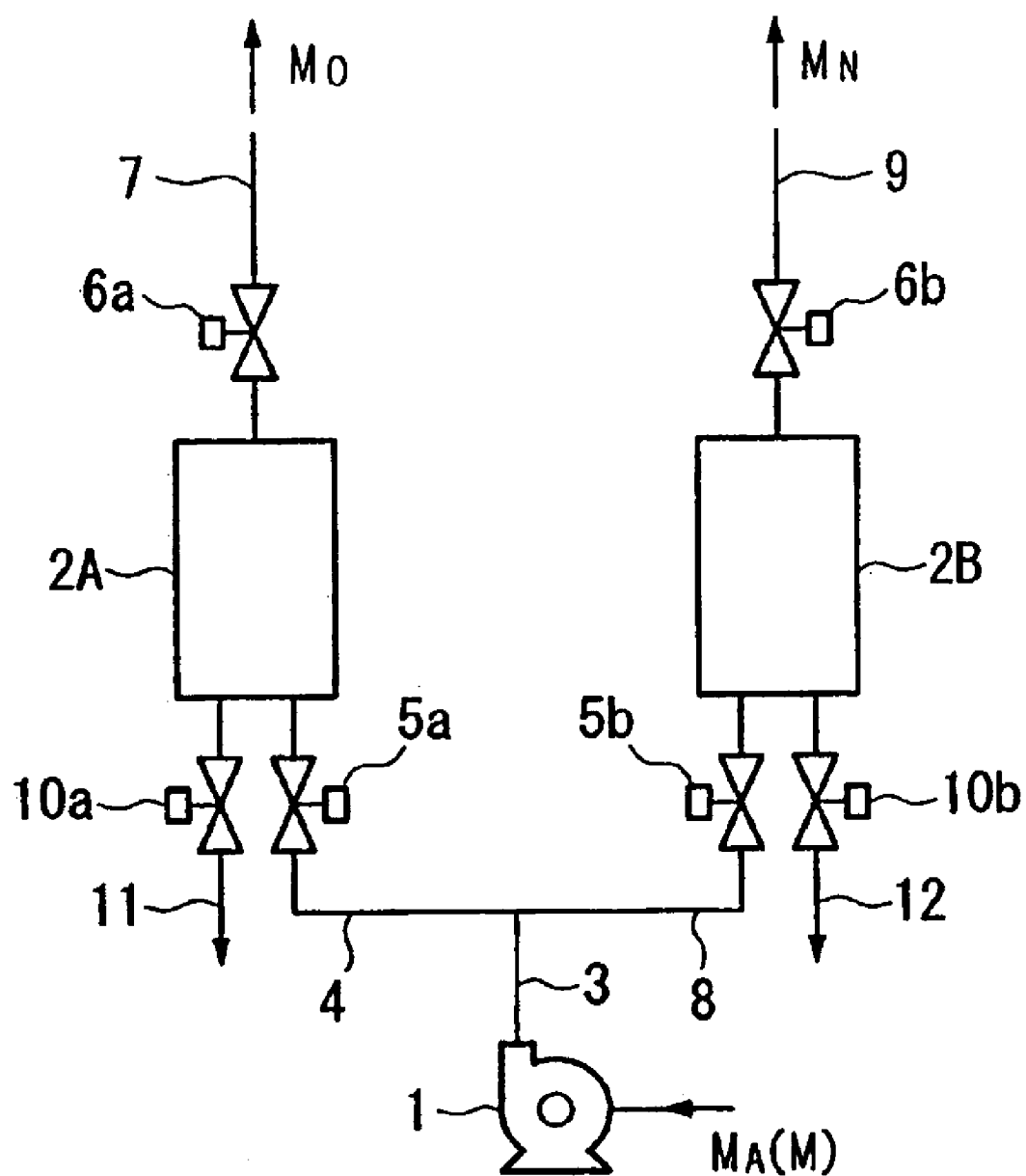
FIG. 1 is a schematic diagram of the first system for separating gas based on a PSA method of the present invention.

FIG. 1 is a schematic diagram showing the system for separating gas based on a PSA method of the first embodiment. In the first embodiment, air MA is used for the feed gas mixture M, and oxygen and nitrogen, which are the main gas components of air, are separated and recovered as gas products.

A system of this embodiment comprises a compressor 1 for compressing air MA, which is the feed gas mixture M, adsorption columns 2A and 2B each of which is filled with an adsorbent having different adsorption properties to oxygen ($O_2$) and nitrogen ($N_2$), which are the main gas components of air. Specifically, the adsorption column 2A is filled with a zeolite adsorbent, which selectively adsorbs nitrogen and which does not readily adsorb oxygen, and the adsorption column 2B is filled with a MSC adsorbent, which selectively adsorbs oxygen and which does not readily adsorb nitrogen. The compressor 1 and the adsorption columns 2A and 2B are connected by pipelines and valves, and thereby air MA which is alternately introduced into the adsorption columns 2A and 2B, passes through the adsorption columns 2A and 2B, and flows out from the adsorption columns 2A and 2B is recovered.

Air MA is pressurized by the compressor 1 to 100–1,000 kPa (this is the gage pressure of the compressor), and preferably to 200–800 kPa. The pressurized air MA is caused to pass through pipelines 3 and 4 and a feed supply valve 5a, and is introduced into the adsorption column 2A. Since the adsorption column 2A is filled with the zeolite adsorbent, which selectively adsorbs nitrogen, as explained above, nitrogen ($N_2$) is preferentially adsorbed. Oxygen ($O_2$), which is not readily adsorbed by the zeolite adsorbent, is caused to flow out from an exit of the adsorption column 2A, to pass through a product discharge valve 6a and a pipeline 7, and it is yielded as an oxygen enriched gas MO having an oxygen concentration of 85–95% by volume (below, "%" means "% by volume").

Specifically, in the adsorption column 2A, the area of the zeolite adsorbent, in which nitrogen is adsorbed increases toward the exit of the adsorption column 2A, with the passage of time. When the amount of nitrogen contained in the oxygen enriched gas, which is caused to flow from the exit of the adsorption column 2A to the pipeline 7, exceeds a tolerable amount, the adsorption step in the adsorption column 2A is finished. Specifically, the feed supply valve 5a and the product discharge valve 6a are closed. Simultaneously, a feed supply valve 5b and a product discharge valve 6b, which are provided with the adsorption column 2B, are opened.

Air is passed through a pipeline 8 and the feed supply valve 5b, and is introduced into the adsorption column 2B, instead of the adsorption column 2A, by opening the feed supply valve 5b and the product discharge valve 6b. Since the adsorption column 2B is filled with the MSC adsorbent, which selectively adsorbs oxygen, as explained above, oxygen ($O_2$) is selectively adsorbed. Nitrogen ($N_2$), which is not readily adsorbed by the MSC, is caused to flow from an exit of the adsorption column 2B, and is passed through a product discharge valve 6b and a pipeline 9, and it is yielded as a nitrogen enriched gas MN having a nitrogen concentration of 99–99.99%.

Specifically, in the adsorption column 2B, the area of the MSC, in which oxygen is adsorbed increases toward the exit of the adsorption column 2B, with the passage of time. When the amount of oxygen contained in the nitrogen enriched gas, which is caused to flow from the exit of the adsorption column 2B to the pipeline 9, exceeds a tolerant amount, the adsorption step in the adsorption column 2B is finished by closing the feed supply valve 5b and the product discharge valve 6b. Simultaneously, the feed supply valve 5a and the product discharge valve 6a, which are provided with the adsorption column 2A, are opened. Then, air MA is introduced into the adsorption column 2A, in which the zeolite adsorbent used in the previous adsorption step is regenerated in advance, and thereby the oxygen enriched gas MO is yielded again.

By operating these valves in this manner and thereby alternately changing the introduction of air to the adsorption columns 2A and 2B, the oxygen enriched gas MO is yielded as a product from the adsorption column 2A and the nitrogen enriched gas MN is yielded as a product from the other adsorption column 2B.

As explained above, during the adsorption step in the adsorption column 2A or 2B, since the adsorbent filled in the other adsorption column 2B or 2A is used in the previous adsorption step, the adsorbent is saturated with the component, which is easily adsorbed. In order to desorb the component, which is easily adsorbed, and to regenerate the adsorbent, a regeneration step is performed.

In this embodiment, the regeneration step is carried out as follows.

For example, when the adsorption column 2A, which was used in the adsorption step, is regenerated, the feed supply valve 5a and the product discharge valve 6a are closed. An exhaust valve 10a which is provided with the adsorption column 2A is opened, and thereby the inside of the adsorption column 2A communicates with the atmosphere, and gas held by the adsorbent and accumulated in the adsorption column 2A is exhausted to the atmosphere via a pipeline 11. When the pressure in the adsorption column 2A decreases, nitrogen which is adsorbed by the adsorbent (zeolite) desorbs. Due to this, the zeolite adsorbent is regenerated. After the regeneration step, the adsorption column 2A is maintained until the next adsorption step by closing the exhaust valve 10a.

Similarly, the regeneration of the adsorption column 2B is performed. When the adsorption column 2B is regenerated, the feed supply valve 5b and the product discharge valve 6b are closed. An exhaust valve 10b which is provided with the adsorption column 2B is opened, and thereby the inside of the adsorption column 2B communicates with the atmosphere, and gas held by the adsorbent and accumulated in the adsorption column 2B is exhausted to the atmosphere via a pipeline 12. After the regeneration step, the adsorption column 2B is maintained until the next adsorption step by closing the exhaust valve 10b.

The period of the adsorption step and the regeneration step in the adsorption column 2A and 2B, that is, the regeneration period of the adsorption column 2B while the adsorption column 2A is in the adsorption step and the adsorption period of the adsorption column 2B while the adsorption column 2A is in the regeneration step, are preferably equivalent. However, it is possible to increase one period of the adsorption step and the regeneration step. When one period of the adsorption step and the regeneration step increases, the other step may be continued or may be stopped and be maintained by closing the valves.

In the above embodiment, air MA is used as the feed gas mixture M, and the oxygen enriched gas MO and the nitrogen enriched gas MN are separated and recovered. However, when krypton and nitrogen are the main gas components, these gas components can be separated and recovered by using another combination of the adsorbents such as a combination of the zeolite adsorbent and an activated carbon adsorbent.

When krypton and nitrogen are separated and recovered by using the zeolite adsorbent and the activated carbon adsorbent, a krypton enriched gas having a krypton concentration of 99–99.999% and a nitrogen enriched gas having a nitrogen concentration of 99–99.999% are separated and yielded as gas products by compressing the gas mixture using the compressor 1 to 100–2,000 kPa, and preferably to 200–1,000 kPa.

Second Embodiment

The second embodiment will be explained with reference to FIG. 2. In this second embodiment, product tanks 13A and 13B are provided with the pipelines 7 and 9, through which the products from the adsorption column 2A and 2B flow, in the system shown in FIG. 1. The products yielded in the adsorption columns 2A and 2B are stored in the product tanks 13A and 13B, and the products are used for purging the adsorption columns 2A and 2B during the regeneration step. These operations will be explained in detailed.

Figure 2:
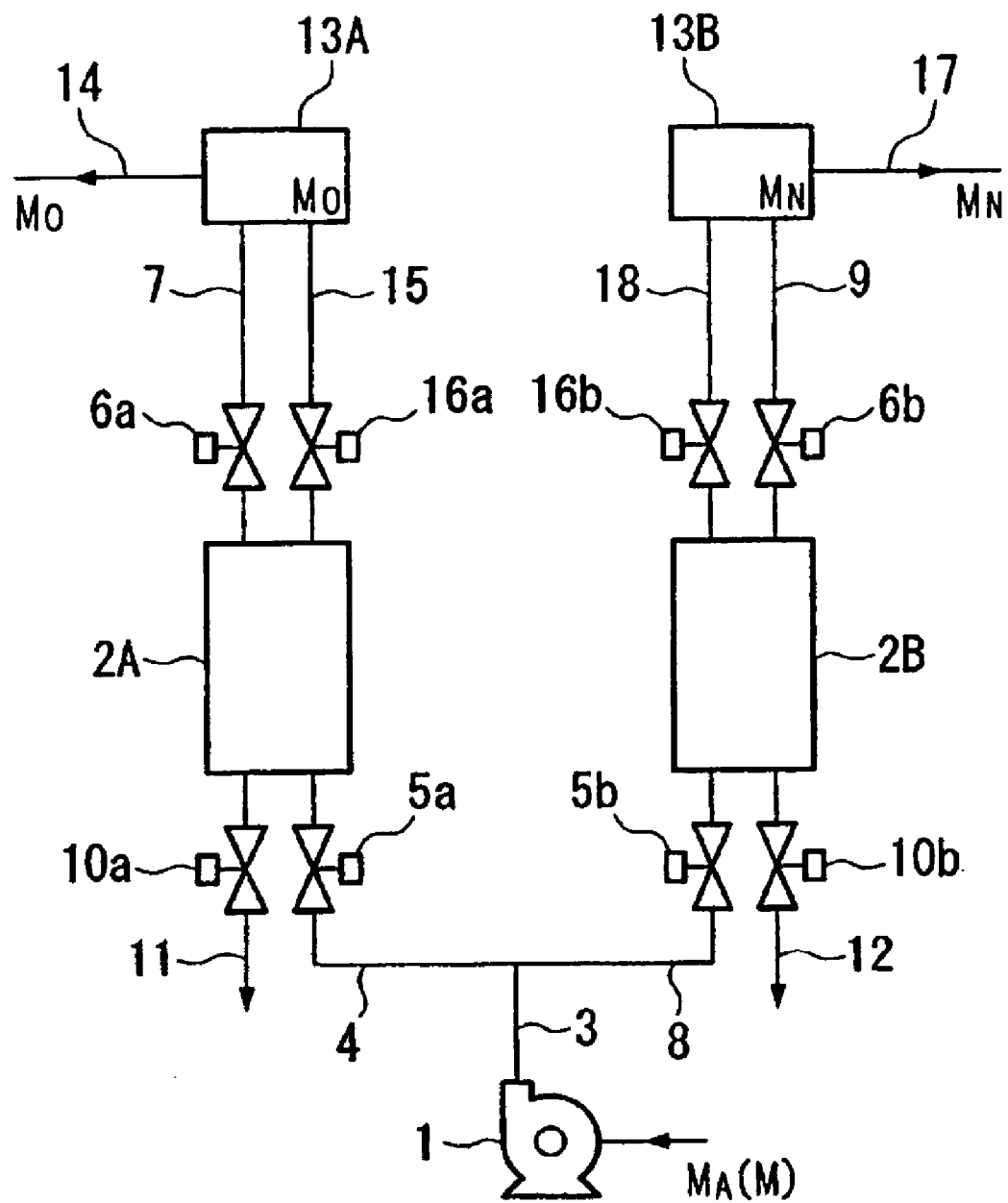
FIG. 2 is a schematic diagram of the second system for separating gas based on a PSA method of the present invention.
Figure 3:
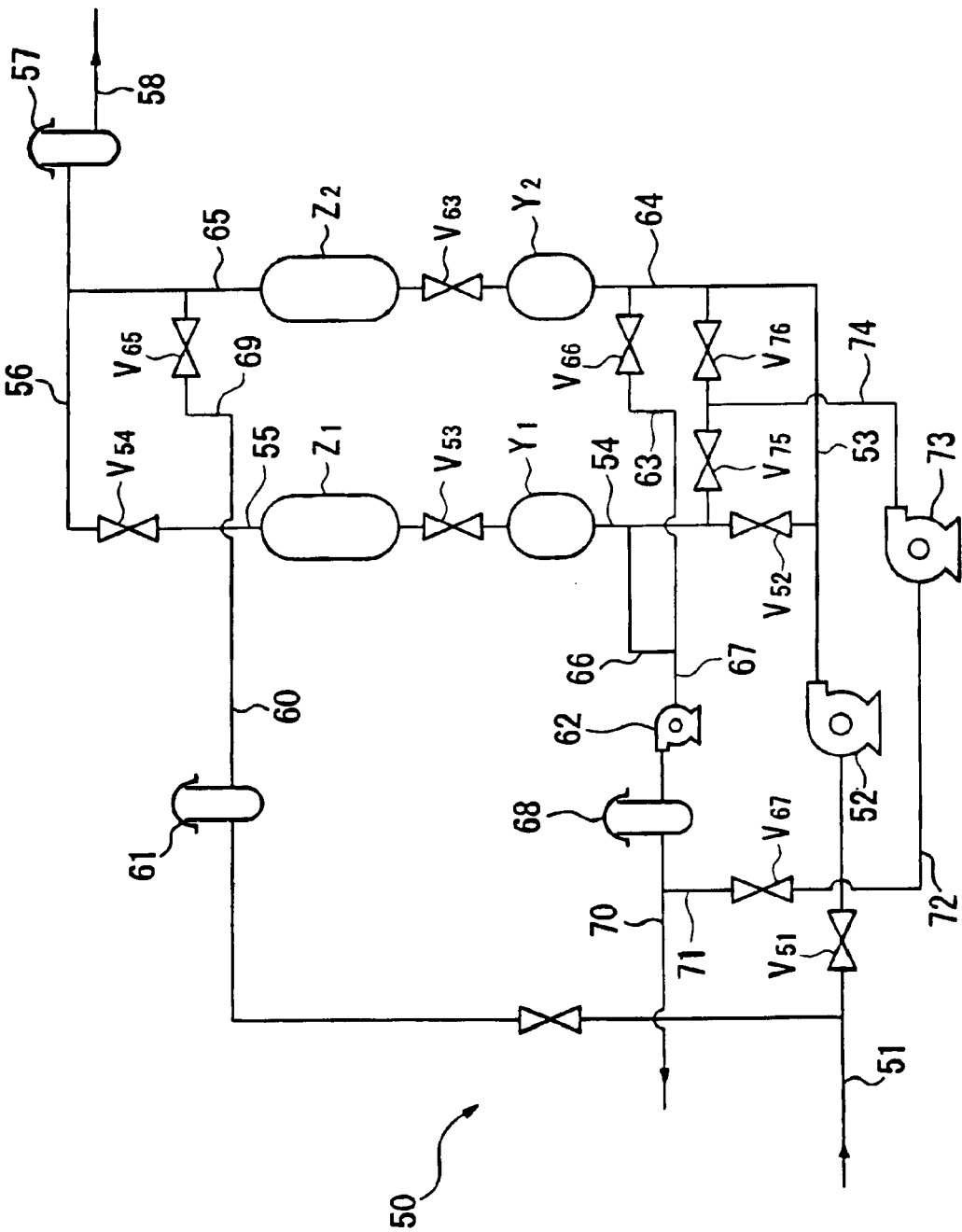
FIG. 3 is a schematic diagram of a conventional method for separating gas based on a PSA method.

Moreover, the components shown in FIG. 2, which are the same as the components shown in FIG. 1, have the same reference numerals as shown in FIG. 1. Thereby, an explanation for those same components is omitted in this embodiment.

During the adsorption step in the adsorption column 2A, the oxygen enriched gas MO, which flows through the product discharge valve 6a and the pipeline 7, is introduced into and stored in the oxygen enriched gas tank 13A. The stored oxygen enriched gas is supplied into a point of use, via the pipeline 14. After the adsorption step in the adsorption column 2A is finished, the feed air M is introduced into the adsorption column 2B by operating the valves. Then, the adsorption column 2B is in the adsorption step and the adsorption column 2A is in the regeneration step.

In the regeneration step of the adsorption column 2A in this embodiment, the oxygen enriched gas MO is caused to flow back from the oxygen enriched gas tank 13A to the adsorption column 2A via the pipeline 15 and the purge valve 16a. Thereby, the oxygen enriched gas MO desorbs nitrogen adsorbed by the zeolite adsorbent, and this is caused to flow out together with nitrogen from the system via the exhaust valve 10a and the pipeline 11. Due to this, the component (nitrogen) adsorbed by the adsorbent (zeolite) in the adsorption column 2A is purged by the component (oxygen enriched gas MO), which is not readily adsorbed and which is recovered as a product in the adsorption step. The desorbing of the component which is easily adsorbed is facilitated.

In the regeneration step of the adsorption column 2B, the MSC adsorbent in the adsorption column 2B is similarly regenerated by purging the nitrogen enriched gas MN, which is a gas product. Moreover, the gas product stored in the nitrogen enriched gas tank 13B is introduced into a point of use, via the pipeline 17. Specifically, the nitrogen enriched gas MN is caused to flow back from the nitrogen enriched gas tank 13B to the adsorption column 2B via the pipeline 18 and the purge valve 16b. Thereby, the nitrogen enriched gas MN desorbs oxygen adsorbed by the MSC adsorbent, and this is caused to flow out together with oxygen ($O_2$) from the system via the exhaust valve 10b and the pipeline 12. Due to this, the component (oxygen) adsorbed by the adsorbent (MSC) in the adsorption column 2B is purged by the component (nitrogen enriched gas MN), which is not readily adsorbed and which is recovered as a product in the adsorption step. The desorbing of the component, which is easily adsorbed, is facilitated. The regeneration is performed effectively.

In the first and second embodiments, it is preferable for balance tanks (not shown in figures) to equip to the pipelines 7 and 9, which are provided at the exits of the adsorption columns 2A and 2B, and for gas in the adsorption columns 2A and 2B after the adsorption step and before the regeneration step, which has a similar gas product concentration to that of the gas product, to be introduced and stored in the balance tanks. After the regeneration step, the gas stored in the balance tanks is returned to the adsorption columns 2A and 2B in a low-pressure condition so that the pressure of the adsorption columns 2A and 2B and the pressure of the balance tanks are equal to each other. Thereby, it is possible to use effectively the feed gas, and to improve the recovery percentage of the gas product.

In the first and second embodiments, the method and the system for separating the gas mixture containing two main gas components are explained. However, the present invention is not limited to these embodiments. The present invention is applied to a gas mixture containing a plurality of gases. Specifically, by providing plural adsorption columns, which contain adsorbents having a suitable adsorption property for each component in the gas mixture, the plurality of components, which are different from each other, can be recovered simultaneously.

EXAMPLES

Example 1

In the system shown in FIG. 1, the adsorption column 2A was filled with a Na-X type zeolite adsorbent, and the other adsorption column 2B was filled with the MSC adsorbent. In addition, an activated alumina was also filled at the entrance portion in the adsorption columns 2A and 2B to adsorb and remove moisture. Air MA was pressurized to 700 kPa by the compressor 1, and a feed gas mixture M was prepared. Then the feed gas mixture M was supplied to the adsorption columns 2A and 2B. An oxygen enriched gas having an oxygen concentration of 93% was yielded from the adsorption column 2A, in which the Na-X type zeolite adsorbent was filled. A nitrogen enriched gas having a nitrogen concentration of 99% was yielded from the adsorption column 2B, in which the MSC adsorbent was filled.

In this Example, instead of the Na-X type zeolite adsorbent, zeolite adsorbents, in which all or part of the Na-ions in the Na-X type zeolite are exchanged with another alkali metal ion or an alkali-earth metal ion, and Ca-A type zeolite, mordenite, or the like, are used.

Example 2

In the system shown in FIG. 1, the adsorption column 2A was filled with the Na-A type zeolite adsorbent, and the other adsorption column 2B was filled with an activated carbon adsorbent. A feed gas mixture M containing dry nitrogen and dry krypton was pressurized to 700 kPa by the compressor 1, and it was supplied to the adsorption columns 2A and 2B. A krypton enriched gas having a krypton concentration of 99.99% was yielded from the adsorption column 2A, which was filled with the Na-A type zeolite adsorbent. A nitrogen enriched gas having a nitrogen concentration of 99.5% was yielded from the adsorption column 2B, which was filled with the activated carbon adsorbent.

In addition, a feed gas mixture M was separated in a manner identical to the above processes, except that the feed gas mixture M containing nitrogen and krypton was changed to a feed gas mixture M containing nitrogen and xenon. A xenon enriched gas having a xenon concentration of 99.99% was yielded from the adsorption column 2A, in which was filled with the Na-A type zeolite adsorbent, in the same way as for the krypton. A nitrogen enriched gas having a nitrogen concentration of 99.5% was yielded from the adsorption column 2B, which was filled with the activated carbon adsorbent.

Moreover, since krypton and xenon, which are separated in Example 2, are extremely scarce, it is not economically preferable to discharge them to the outside of the system. Therefore, the pipelines 11 and 12 for exhaust gases shown in FIG. 1 were joined with the introduction pipe for the feed gas, which is provided with the compressor 1, and thereby the exhaust gas containing krypton or xenon was circulated in the system. This was effective to reduce the loss of scarce krypton and xenon during the separation.

INDUSTRIAL APPLICABILITY

The method and the system for separating gas of the present invention is carried out in a manner as explained above, and they have the following industrial applicability.

In the present invention, the feed gas mixture containing a plurality of component gases is introduced into the system comprising adsorption columns filled with adsorbents having different adsorption properties, and each the components is separated and recovered. Therefore, two components are enriched and recovered as gas products from the feed gas mixture using this simple system based on a PSA method.

In addition, these gas products are recovered as the components which are not readily adsorbed by the adsorbents in the adsorption step. That is, these gas products are yielded while they are pressurized maintaining the introduction pressure of the feed gas mixture to the adsorption columns. Therefore, the present invention does not need a compressor for pressurizing and sending the gas products to the point of use. Due to this, the system cost and running cost are reduced.

Since, in the present invention, the compressor for introducing the feed gas mixture alternately supplies the feed gas mixture into the two adsorption columns, there need not be pauses during the operation, and the compressor is used effectively.

The compressor for introducing the feed gas mixture which is used in a one column type PSA is subjected to an excess operation, such that compression and exhausting are repeated alternately. However, there is no need for the compressor in the present invention to be subjected to such excess operation. Due to this, the compressor is always in constant operation, and this leads to an increase in the life of the device.

In the present invention, the product tank is provided with the product introduction pipe and the gas product which is recovered in the adsorption step is stored in the product tank. The stored gas product is used as a purge gas which is used to desorb the components which are easily adsorbed by the adsorbent in the regeneration step. Therefore, the yield percentage of the gas product is remarkably improved.

Furthermore, in the present invention, since the balance tank is provided with the adsorption column, the exhaust gas, which is exhausted from the adsorption column after the adsorption step before the regeneration step, is introduced into the low pressurized adsorption column after the regeneration step. Thereby, the pressure of the low pressurized adsorption column after the regeneration step increases so that the pressure of the adsorption column is equal to the pressure of the balance tank. The feed gas mixture is not discharged wastefully, and it is used effectively. The yield percentage of the gas product is increased.

What is claimed is:

1. A method for separating gas in which at least two main gas components are separated and recovered from a gas mixture containing the at least two main gas components by a pressure swing adsorption method, wherein the method comprises the steps of:

pressurizing the gas mixture;

alternately repeating a step in which a first main gas component is separated as a first gas product using a first adsorbent, which does not readily adsorb the first main gas component and which easily adsorbs a second main gas component, and a step, in which the second main gas component is separated as a second gas product using a second adsorbent, which easily adsorbs the first main gas component and which does not readily adsorb the second main gas component, and thereby the first and second gas products are yielded simultaneously from the gas mixture, wherein during the step in which the first and second main gas components are separated as the first and second gas products, the first and second gas products are stored in product tanks; and after the step in which the first and second main gas components are separated as the first and second gas products, the first and second gas products, which are stored in the product tanks, are used for purging the first and second adsorbents, a gas adsorbed by the at least one of the first or second adsorbent is joined to the gas mixture, and the gas mixture is air.

2. A method for separating gas according to claim 1, wherein the first adsorbent is a zeolite and the second adsorbent is a molecular sieve carbon.

3. A method for separating gas in which at least two main gas components are separated and recovered from a gas mixture containing the at least two main gas components by a pressure swing adsorption method, wherein the method comprises the steps of:

pressurizing the gas mixture;

alternately repeating a step in which a first main gas component is separated as a first gas product using a first adsorbent, which does not readily adsorb the first main gas component and which easily adsorbs a second main gas component, and a step, in which the second main gas component is separated as a second gas product using a second adsorbent, which easily adsorbs the first main gas component and which does not readily adsorb the second main gas component, and thereby the first and second gas products are yielded simultaneously from the gas mixture, wherein during the step in which the first and second main gas components are separated as the first and second gas products, the first and second gas products are stored in product tanks; and after the step in which the first and second main gas components are separated as the first and second gas products, the first and second gas products, which are stored in the product tanks, are used for purging the first and second adsorbents, a gas adsorbed by the at least one of the first or second adsorbent is joined to the gas mixture, and the gas mixture contains nitrogen and at least one of krypton and xenon.

4. A method for separating gas according to claim 3, wherein the first adsorbent is a Na-A type zeolite which selectively adsorbs nitrogen; and the second adsorbent is an activated carbon which selectively adsorbs krypton and xenon.

5. A system for separating gas in which at least two main gas components are separated from a gas mixture containing the at least two main gas components by a pressure swing adsorption system, wherein the system comprises:

a gas pressurizing device;

a first adsorption column filled with a first adsorbent, which does not readily adsorb the first main gas component and which easily adsorbs a second main gas component;

a second adsorption column filled with a second adsorbent, which easily adsorbs the first main gas component and which does not readily adsorb the second main gas component; and pipelines and valves for introducing alternately the gas mixture into the first and second columns and through which the first and second main gas components from the first and second columns flows;

a first product tank for storing the first main gas component, which is provided with a pipeline connected with the first adsorption column;

a pipeline through which the first main gas component from the first product tank flows back to the first adsorption column;

a second product tank for storing the second main gas component, which is provided with a pipeline connected with the second adsorption column;

a pipeline through which the second main gas component from the second product tank flows back to the second adsorption column;

a first exhaust pipe for exhausting the second main gas component adsorbed in the first adsorption column; and a second exhaust pipe for exhausting the first main gas component adsorbed in the second adsorption column; wherein the first and second exhaust pipes are joined with the pipelines for alternately introducing the gas mixture into the first and second adsorption columns.

6. A system for separating gas according to claim 5, wherein the first main gas component is oxygen, and the second main gas component is nitrogen, and wherein the first adsorbent filled in the first adsorption column is one adsorbent selected from the group consisting of Na-X type zeolite adsorbent, zeolite adsorbent in which all or part of the Na-ions in the Na-X type zeolite are exchanged with another alkali metal ion or an alkali-earth metal ion, and Ca-A type zeolite or mordenite, and the second adsorbent filled in the second adsorption column is MSC adsorbent.

7. A system for separating gas according to claim 6, wherein an activated alumina is filled at the entrance portion in the first and second adsorption columns.

8. A system for separating gas according to claim 5, wherein the first main gas component is a gas containing at least one of krypton and xenon, and the second main gas component is nitrogen; and the first adsorbent filled in the first adsorption column is a Na-A type zeolite adsorbent, and the second adsorbent filled in the second adsorption column is an activated carbon adsorbent.

* * * * *